(12) United States Patent
Tanikawa et al.

(10) Patent No.: US 8,256,744 B2
(45) Date of Patent: Sep. 4, 2012

(54) DIRECT TOUCH TYPE METAL DIAPHRAGM VALVE

(75) Inventors: Tsuyoshi Tanikawa, Osaka (JP); Michio Yamaji, Osaka (JP); Tadayuki Yakushijin, Osaka (JP); Hiroshi Fukuchi, Osaka (JP)

(73) Assignee: Fujikin Incorporated, Osaka (JP)

( * ) Notice: Subject to any disclaimer, the term of this patent is extended or adjusted under 35 U.S.C. 154(b) by 470 days.

(21) Appl. No.: 11/914,517

(22) PCT Filed: May 10, 2006

(86) PCT No.: PCT/JP2006/309369
§ 371 (c)(1),
(2), (4) Date: Dec. 22, 2009

(87) PCT Pub. No.: WO2007/026448
PCT Pub. Date: Mar. 8, 2007

(65) Prior Publication Data
US 2010/0090151 A1 Apr. 15, 2010

(30) Foreign Application Priority Data
Aug. 30, 2005 (JP) ................................. 2005-250300

(51) Int. Cl.
*F16K 7/12* (2006.01)

(52) U.S. Cl. ....................... 251/331; 251/335.2; 251/368

(58) Field of Classification Search .................. 251/331, 251/335.2, 368
See application file for complete search history.

(56) References Cited

U.S. PATENT DOCUMENTS

| | | | | |
|---|---|---|---|---|
| 3,349,795 A | * | 10/1967 | Matsutani | 251/331 |
| 4,596,268 A | * | 6/1986 | Jonas | 251/331 |
| 4,684,106 A | * | 8/1987 | Kolenc et al. | 251/335.2 |
| 4,828,219 A | * | 5/1989 | Ohmi et al. | 251/368 |
| 5,009,778 A | * | 4/1991 | Nickerson et al. | 251/335.2 |
| 5,186,434 A | | 2/1993 | Nishimura et al. | |
| 5,295,662 A | * | 3/1994 | Yamaji et al. | 251/331 |
| 5,335,691 A | * | 8/1994 | Kolenc | 251/331 |

(Continued)

FOREIGN PATENT DOCUMENTS

| | | |
|---|---|---|
| JP | 5-26357 | 2/1993 |
| JP | 05-080858 A | 4/1993 |
| JP | 7-317925 A | 12/1995 |

(Continued)

OTHER PUBLICATIONS

International Search Report, issued in corresponding application PCT/JP2006/309369, completed Jul. 14, 2006, mailed Jul. 25, 2006.

*Primary Examiner* — John Bastianelli
(74) *Attorney, Agent, or Firm* — Griffin & Szipl, P.C.

(57) ABSTRACT

A direct touch type metal diaphragm valve, wherein durability of the valve, that is to say, the ensured number of continuous open/close operations of the valve, is substantially increased under conditions that an appropriate flow rate coefficient Cv is maintained, and changes of the afore-mentioned Cv value over time are mitigated by means of restricting the deformation of the valve seat over time. The afore-mentioned metal diaphragm is formed in a round, reverse-dish shape by laminating a plural number of thin stainless steel plates and a thin Nickel.Cobalt alloy plate, and its center part is bulged upward, and the maximum valve stroke of the valve is regulated to be 55% to 70% of the distance of the maximum bulge height $\Delta h$ of the afore-mentioned metal diaphragm.

9 Claims, 7 Drawing Sheets

U.S. PATENT DOCUMENTS

| | | | | |
|---|---|---|---|---|
| 5,413,311 A | * | 5/1995 | Arstein et al. | 251/331 |
| 5,730,423 A | * | 3/1998 | Wu et al. | 251/331 |
| 5,851,004 A | * | 12/1998 | Wu et al. | 251/331 |
| 6,341,758 B1 | * | 1/2002 | Shih et al. | 251/335.2 |
| 6,685,164 B1 | * | 2/2004 | Koizumi et al. | 251/331 |
| 2003/0042459 A1 | | 3/2003 | Gregoire | |
| 2006/0289825 A1 | * | 12/2006 | Wincek | 251/331 |

FOREIGN PATENT DOCUMENTS

| | | |
|---|---|---|
| JP | 8-105554 A | 4/1996 |
| JP | 10-148275 A | 6/1998 |
| JP | 2001-289336 A | 10/2001 |
| JP | 2001525909 A | 12/2001 |
| WO | 98/16765 | 4/1998 |

\* cited by examiner

PRIOR ART

DIRECT TOUCH TYPE METAL DIAPHRAGM VALVE

This is a National Phase Application in the United States of International Patent Application No. PCT/JP2006/309369 filed May 10, 2006, which claims priority on Japanese Patent Application No. JP 2005-250300, filed Aug. 20, 2005. The entire disclosures of the above patent applications are hereby incorporated by reference.

FIELD OF THE INVENTION

The present invention relates to a direct touch type metal diaphragm valve such as is mainly used for gas supply systems and the like in semiconductor manufacturing facilities. The present invention also relates to a direct touch type metal diaphragm valve with high durability which makes it possible that the number of repetitions of the open/close operation of the valve is considerably increased, and that the variation of flow characteristics is reduced by means of stably maintaining a flow rate coefficient of the valve.

BACKGROUND OF THE INVENTION

Figure 10:
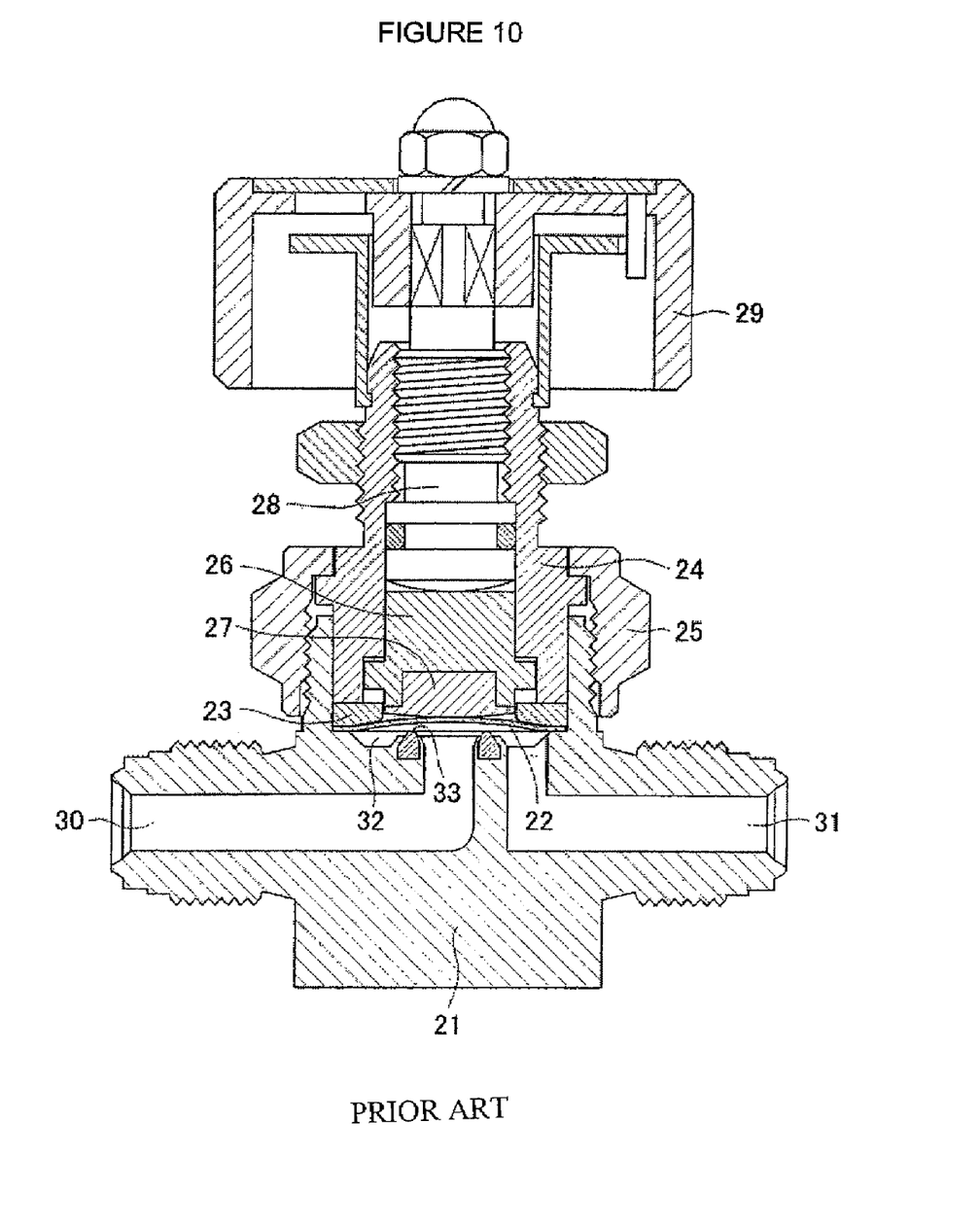
FIG. 10 is a cross sectional schematic diagram of a conventional direct touch type metal diaphragm valve.

A direct touch type metal diaphragm valve (hereinafter called a "metal diaphragm valve") is generally structured as shown in FIG. 10. It is not only excellent in responsitivity and replacementabity of fluids, but also is exhibits near-particle free characteristics. Therefore, the metal diaphragm valve has been widely used in the fields such as facilities for semiconductor manufacturing, chemical goods manufacturing, food products manufacturing, and the like.

According to FIG. 10, 21 designates a body, 22 designates a metal diaphragm, 23 designates a stopper mechanism, 24 designates a bonnet, 25 designates a bonnet nut, 26 designates a disc, 27 designates a diaphragm presser, 28 designates a stem, 29 designates a handle, 30, 31 designate a fluid inlet and outlet, 32 designates a valve chamber and 33 designates a valve seat. A fluid passage is closed by means of a metal diaphragm 22 that is pressed from above to a valve seat 33 through the mediation of the diaphragm presser 27, while the fluid passage is opened by means of the diaphragm presser 27 that is pulled upward to restore the metal diaphragm 22 to its original reverse-dish shape. A detailed description is omitted herewith because this type of metal diaphragm has been disclosed by others (e.g. TOKU-KAI-HEI No. 5-80858, and the like).

The afore-mentioned metal diaphragm 22 is normally formed with a laminated body made out of 2 to 3 pieces of 0.1 to 0.2 mm thick stainless steel made plate, and is made by means of a bulging mould in a reverse-dish shape in the center of the laminated body cut in a round shape. The maximum height $\Delta h$ of the bulging portion of the reversed-dish shaped metal diaphragm 22 is set at approximately 1.1 to 1.3 mm with the afore-mentioned 9.52 mm$\phi$ metal diaphragm (outer diameter of approximately 26 mm$\phi$).

The afore-mentioned valve seat 33 has been manufactured by forming it in a desired shape using engineering plastics (e.g. PFA: perfluoroalkoxyi), and fitting it into a valve seat holding groove integrally formed with the valve body 21, thus the valve seat is fixed by partially clapping it to the holding groove.

Thus, it is necessarily required that a valve stoke $\Delta S$ (namely, a deformation volume of the metal diaphragm 22) is made to be large in order to increase the flow volume of gases passing through the fluid passage because, as shown in FIG. 10, the reverse-shaped metal diaphragm 22 is employed for this type of metal diaphragm valve. Accordingly, the valve is so made that a maximum bulge height $\Delta h$ of the metal diaphragm 22, which is normally bulge-deformed in the reverse-shape, is made large, and the distance nearly equivalent to the height $\Delta h$ is made to be a full stroke $\Delta S$ of the valve.

As a result, the metal diaphragm 22 is deformed, by size close to the bulge height $\Delta h$, with thrust when the valve is closed in the case of the NO (normally open) type metal diaphragm so that the metal diaphragm is pressed to a valve seat 33 so as to be in a near-flat shaped configuration. It is also same with the NC (normally closed) type metal diaphragm valve. The metal diaphragm 22 is deformed, by size close to the maximum bulge height $\Delta h$, at all times with thrust so that the diaphragm becomes near-flat shaped, and is restored to its original bulged reverse-dish shape due to elastic force and fluid pressure of the metal diaphragm 22 when the valve opens.

On the other hand, as stated above, the maximum flow rate of this type of metal diaphragm valve is closely related to the valve stroke $\Delta S$ of the metal diaphragm 22, thus making it possible that the greater flow rate of fluids is chosen by making the valve stroke $\Delta S$ larger. However, as stated above, the elastic deformation volume of the metal diaphragm has its own limitation. Therefore, normally, with the metal diaphragm 22 (having an outer diameter of 26 mm$\phi$) of a valve having an inside diameter of 9.52 mm$\phi$ of the fluid passage, the maximum bulge height $\Delta$ is limited to approximately 1.2 to 1.3 mm because the larger a maximum bulge height $\Delta h$ becomes, the more cracks and the like are likely to be caused due to the deformation of the metal diaphragm 22.

As disclosed above, the relation between the valve stroke $\Delta S$ of the afore-mentioned metal diaphragm valve and the flow rate and the like is generally indicated by a flow rate coefficient (Cv value). More specifically, the definition of the Cv value of the afore-mentioned valve is "a numeric value of the flow rate expressed in gal/min when clean water flows while keeping the differential pressure of the valve inlet and outlet at 1 psi." When the fluid is water, the Cv value is derived from:

[mathematical expression 1]

$$Q' = Cv\sqrt{(p_1' - p_2')/Gl'} \qquad \text{Equation (1)}$$

where Q'=the flow rate gal/min, $P_1'$=inlet pressure psi, Gl' is the specific gravity of the fluid (when water, Gl'=1) and $P_2'$=outlet pressure psi.

In the case when the fluid is a gas, based on the idea that is the same as the case wherein the afore-mentioned fluid is water, the Cv value is derived from:

[mathematical expression 2]

$$cv = \frac{Qg}{4140}\sqrt{\frac{Gg(273+t)}{(p_1-p_2)p_2}} \qquad \text{Equation (2)}$$

where Qg [m/h (standard state)] is the flow rate of the gas at the standard state (15° C., 760 mmHg abs), t [° C.] is the gas temperature, Gg is a specific gravity of the gas (when air, Gg=1), $P_1$ [MPa abs] is the primary side absolute pressure and $P_2$ [MPa abs] is the secondary side absolute pressure.

Figure 8:
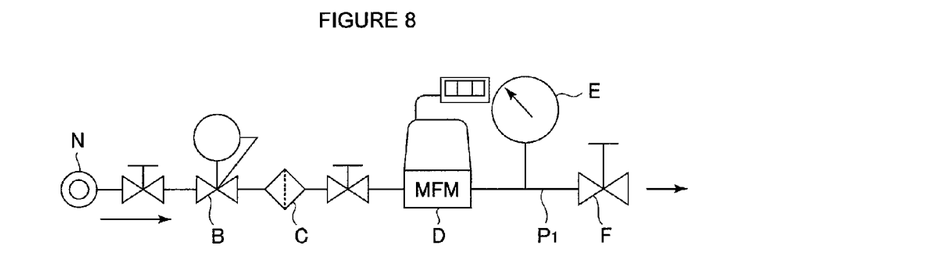
FIG. 8 is a block system diagram of a Cv measurement testing device used with the present invention.

Furthermore, the gas flow rate Qg, and the like, are usually measured by using a Cv value measurement test device as shown in FIG. 8, and the Cv value is calculated by Equation (2) using the result of the measurement. As shown by FIG. 8, N is a fluid under the test specimen (Nitrogen gas), B designates a pressure reducing valve, C designates a filter, D designates a mass flow meter, E designates a manometer, and F designates a test specimen valve (a valve to be tested). The secondary side of the test specimen valve F is open to the atmosphere. A test has been conducted under the conditions of a Nitrogen gas temperature (at room temperature of 20° C.), with the primary side pressure=0.01 MPa, the secondary side pressure=atmospheric pressure (open to the atmosphere), and the valve opening degree=10 to 100% (arbitrarily set). The Cv value required for the metal diaphragm valve is approximately 0.55 to 0.8. In the case of a valve having a diameter of 9.52 mm$\phi$, the Cv value is approximately 0.7 when the maximum bulge height $\Delta h$ of the metal diaphragm 22 is 1.2 mm (a full stroke $\Delta S=1.0$ mm).

With a conventional metal diaphragm valve of this type, there has been a problem that cracks are apt to be caused on a metal diaphragm. Specifically, the durability of the valve expressed by the number of continuous open/close operations of the metal diaphragm valve is normally approximately 1.5 to 2 million times when the valve has a fluid passage of 9.52 mm$\phi$, and approximately 8 to 10 million times when the valve has a fluid passage of 6.35 mm$\phi$. When the number of repetitions of the open/close operation exceeds the above stated durability number, normally damage is caused due to the repetitions of displacement of the metal diaphragm 22, thus resulting in the need to replace the metal diaphragm valve more frequently.

This is particularly true with recently introduced semiconductor manufacturing facilities, which employ the ALD (Atomic Layer Deposition) method for processing because the number of repetitions of open/close operation of a diaphragm valve in the gas supply system is substantially increased. Accordingly, various durability difficulties are encountered in practical use of continuous open/close operations with a conventional metal diaphragm valve (in the case of a 9.52 mm$\phi$ metal diaphragm 22 having an outside diameter of 26 mm$\phi$, approximately 1.5 million times with a full stroke $\Delta S=1.2$ mm, and approximately 2.5 million times with a full stroke $\Delta S=1.0$ mm).

With this type of conventional diaphragm valve, there remains an unsolved problem that the Cv value is difficult to stabilize due to changes of flow rate characteristics over time, that is, the Cv value is easily affected by changes of the Cv value over time. Specifically, for a conventional metal diaphragm valve, as shown in FIG. 10, deformation of the valve seat 33 with time cannot be avoided due to the fact that a synthetic resin material (PFA) is used for the valve seat 33; especially when temperature of fluids passing through the valve is high, the afore-mentioned deformation over time is apt to become bigger. For example, with a conventional valve of 9.52 mm$\phi$, when the fluid temperature rises from 20° C. to 150° C., the valve seat 33 swells, while in the case where the travel volume (a lift stroke) of a stem is fixed constant, it is found that the flow rate of fluid decreases approximately by 18%. And, when open/close operations are conducted under conditions of high temperature, the flow rate at the time when the valve is fully open increases due to changes with time. As a result, for a metal diaphragm valve flow rate increases only for switching of full closing or full opening, and for a metal diaphragm valve for controlling both the flow rate and pressure, accurate control of the flow rate and pressure cannot be expected for the reason that the relationship between the degree of valve opening and the flow rate changes with time.
Patent Document 1: TOKU-KAI-HEI No. 5-80858

Object of the Invention

The present invention solves the above-mentioned problems with a conventional metal diaphragm valve, namely, (a) for semiconductor manufacturing facilities, and the like, which employ an Atomic Layer Deposition (ALD) method for treatment processing, due to the fact that the frequencies of open/close operations of the metal diaphragm valve is increased substantially, the conventional metal diaphragm valve, which has a durability of 1 to 2.5 million times expressed by the number of continuous open/close operations, needs to be changed with increased frequency and maintenance costs go up, and maintenance becomes troublesome, and (b) the shape of the valve seat changes over time, which causes fluctuations of the Cv value thus making flow characteristics of the valve unstable. Also, a primary object of the present invention is to provide a direct touch type metal diaphragm valve that makes it possible for durability of the valve, expressed by continuous open/close operations, to be remarkably improved without decreasing flow characteristics of the valve (that is, without substantial decrease of the Cv value). This object is achieved by means of employing a metal diaphragm valve having the same constitution as that of the conventional one, and that, at the same time, has a Cv value that is less affected by ageing because its flow characteristics are stable.

Means to Achieve the Object

Inventors of the present invention have focused attention on that the durability (the number of continuous open/close operations) of a metal diaphragm valve is closely related to the valve stroke $\Delta S$, and that the valve stroke $\Delta S$ is directly related to the flow rate coefficient Cv (the Cv value). The inventors studied and examined the correlation of durability, valve stroke $\Delta S$ and flow rate coefficient Cv of various metal diaphragm valves by using the afore-mentioned Cv value measurement testing device shown in FIG. 8.

Table 1 below, FIG. 6, FIG. 7 and Table 2 and Table 3 below, and

Figure 9:
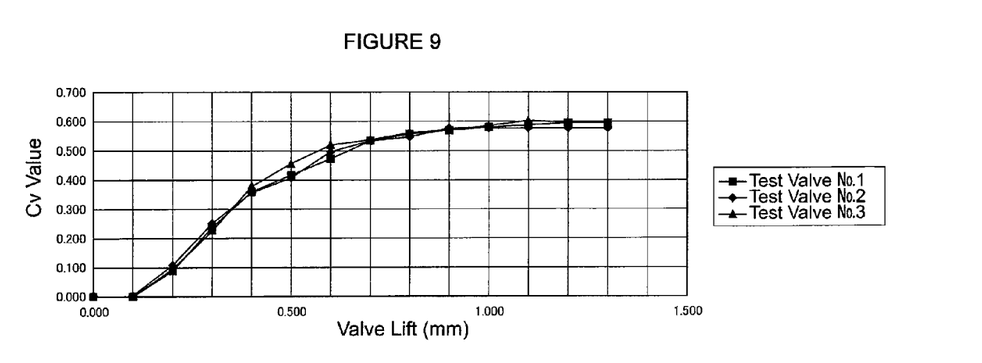
FIG. 9 is the illustration of the results tabulated in Table 2.

FIG. 9 show one example study. Through various tests, it has been learned that, with a conventional metal diaphragm valve, an increase of the Cv value reaches a saturated state when the valve stroke $\Delta S$ exceeds a certain value. Thus, to obtain a prescribed Cv value, there is no need for the valve stroke $\Delta S$ to be made to be the same as the full stroke $\Delta S$, which is equal to the maximum bulge height $\Delta h$ of the metal diaphragm 22. Instead, a Cv value exceeding 0.55 to 0.7 may be achieved with a valve stroke $\Delta S$ having a height of approximately 55 to 70% of the maximum height $\Delta h$.

SUMMARY OF THE INVENTION

The present invention is based on the afore-mentioned findings. The present invention, in accordance with a first embodiment, is fundamentally constituted so that, for a direct touch type metal diaphragm valve made up of a body equipped with a valve seat 13 on the bottom face of a concaved valve chamber 12 for communication to a fluid inlet 10 and a fluid outlet 11, a metal diaphragm 2 is provided above the valve seat 13, and to hold hermeticity of the valve chamber 12, is directly contacted with the valve seat 13 by its center part moving up and down. A stem 8 is provided above the metal diaphragm 2 for free descent/ascent, which allows the center part of the metal diaphragm 2 to descend, and an actuator 9 is provided that allows the stem 8 to descend or ascend, and a press adaptor 3 is provided above the outer peripheral part of the metal diaphragm 2 to hold the metal diaphragm 2 hermetically between the press adaptor 3 and the bottom face of the valve chamber and to control the descent of the stem 8 at the time of the valve being fully closed. The afore-mentioned metal diaphragm 2 is made up of a laminated body comprising a plural number of thin stainless steel plates and thin Nickel.Cobalt alloy plate is formed in the shape of a round, reverse-dish with its center part bulged upward, and the 55 to 70% distance of the maximum bulge height Δh of the afore-mentioned metal diaphragm 2 is regulated to be the maximum valve stroke ΔS of the valve.

The present invention, in accordance with a second embodiment, which modifies the first embodiment, so that the Cv value of the valve at the time of maximum valve stroke ΔS is made to be 0.55 to 0.8.

The present invention, in accordance with a third embodiment, further modifies the first embodiment or the second embodiment, so that the metal diaphragm 2 is made to have a bulge curvature that is 66 to 65 mm with an outer diameter of 15 mmφ, a bulge curvature that is 62 to 63 mm with an outer diameter of 18 to 20 mmφ, or a bulge curvature that is 59 to 61 mm with an outer diameter of 24 to 26 mmφ.

The present invention, in accordance with a fourth embodiment further modifies the first embodiment, so that the metal diaphragm 2 is a round, laminated body made out of 3 pieces of thin stainless steel plate and 1 piece of thin Nickel.Cobalt alloy plate, and its outer diameter is 24 to 26 mmφ, the maximum bulge height Δh is 1.2 to 1.3 mm and the maximum valve stroke ΔS is 0.65 to 0.8 mm.

The present invention, in accordance with a fifth embodiment further modifies the first embodiment, the second embodiment, the third embodiment or the fourth embodiment, so that the valve seat 13 is made with PFA, a stem 8 is provided with a valve stroke adjustment mechanism 16 so that the valve stroke ΔS is adjusted and fixed to a prescribed set value by the afore-mentioned valve stroke adjustment mechanism 16 after continuous open/close operations of the valve are performed over 3000 to 10000 times.

Effect of the Invention

With the present invention, a direct touch type metal diaphragm valve is made so that the maximum bulge height Δh of the metal diaphragm is 55 to 70% of the size (distance) of the maximum bulge height Δh, which is the minimum requirement to obtain a desired flow rate coefficient Cv without making it the full stroke ΔS of a valve, thus allowing distortion volume and distortion stress applied to the metal diaphragm during open/close operations of a valve to be smaller, and at the same time, a prescribed flow rate coefficient (Cv value) as required is fully secured. As a result, it is possible that the feasible number of repetitions of continuous open/close operations, which indicates the durability of the metal diaphragm valve, is raised to approximately 20 to 30 times that of the conventional metal diaphragm valve.

A stroke adjustment mechanism is provided according to the present invention, and approximately 3000 to 10000 continuous open/close operations are conducted before shipment of the valve in order to break-in the synthetic resin made valve seat in order to achieve its stabilization. As a result, the so-called changes with time of the valve seat are substantially reduced, thus the flow rate coefficient Cv (Cv value) is more stable.

LIST OF NUMERALS AND CHARACTERS

A Driving fluid (air)
Δh Maximum Bulge height of a bulging part
ΔS Valve stroke (valve lift)
G Space
N Nitrogen gas source
B Pressure reducing valve
C Filter
D Flow meter
E Manometer
F Valve to be tested
$P_1$ Primary side pressure
1 Body
2 Metal diaphragm
3 Press adaptor (SUS630)
4 Bonnet
5 Screw part
6 Spring
7 Diaphragm presser (polyimide)
8 Stem
8a Brim portion
9 Actuator
9a Supporting cylinder part
9b Screw
9c Piston
10 Fluid inlet
11 Fluid outlet
12 Valve chamber
13 Valve seat
14 Driving shaft
15 Stroke adjustment mechanism
15a Lock nut
16 Electro-magnetic valve
17 Proximity sensor

BEST MODE TO CARRY OUT THE INVENTION

Figure 1:
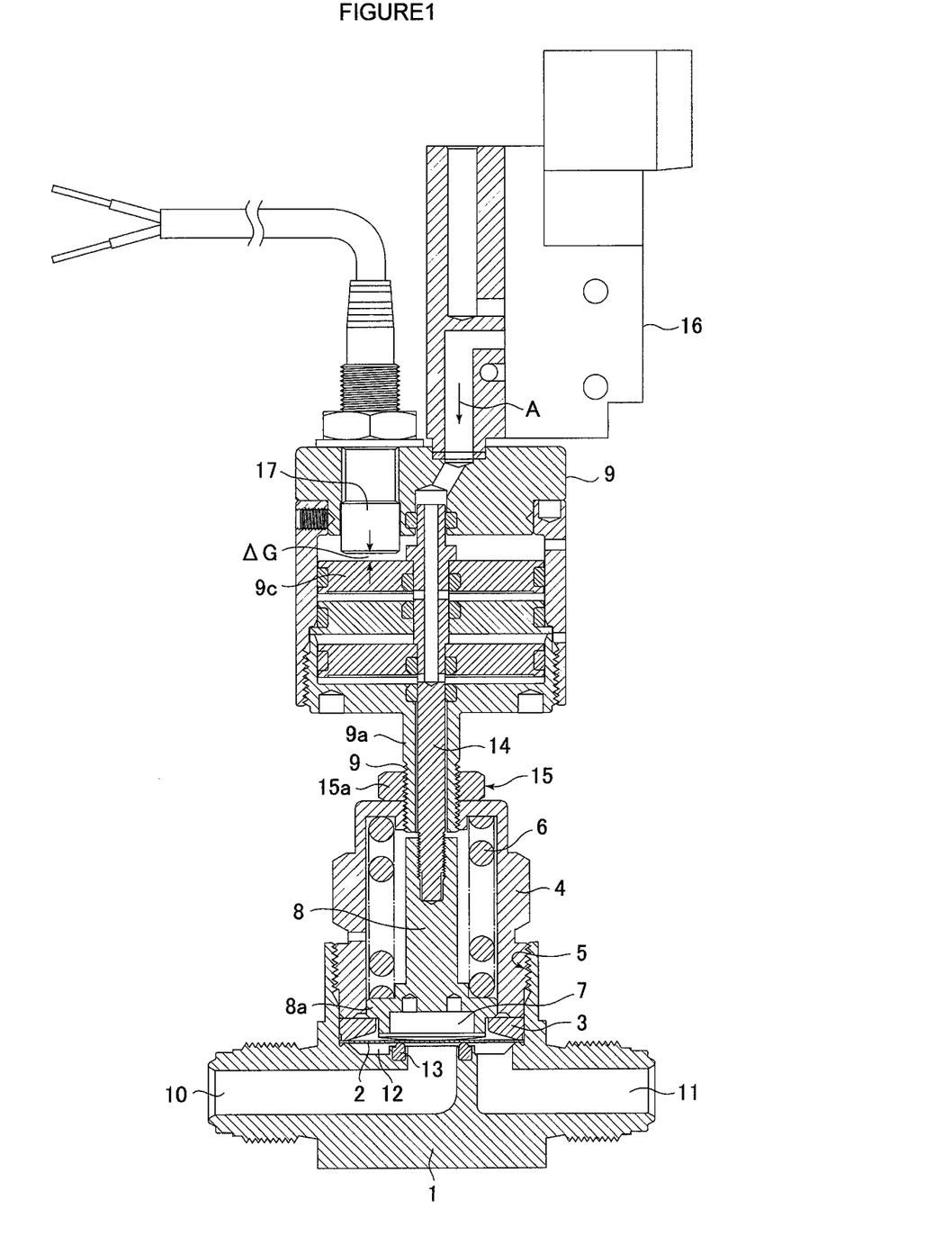
FIG. 1 is a cross sectional schematic view of a direct touch type metal diaphragm valve in accordance with the present invention in the case wherein the diaphragm valve is of the NC (normally closed) type.
Figure 2:
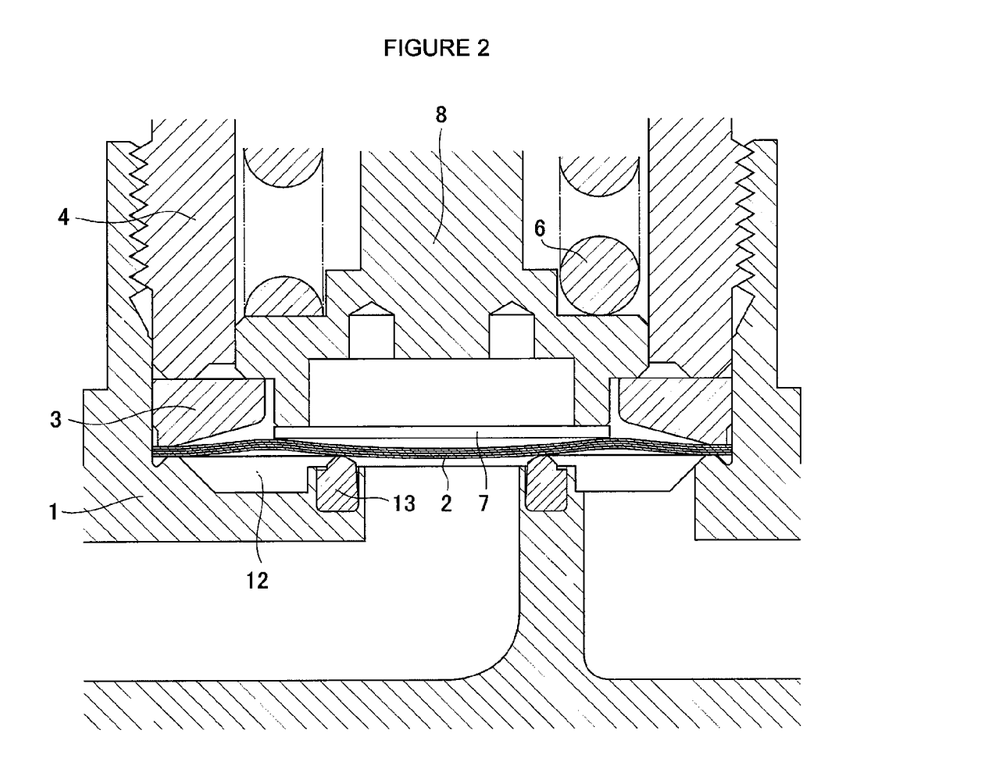
FIG. 2 is an explanatory drawing showing a deformed condition of the metal diaphragm when the valve is closed with a valve stroke ΔS=1.5 mm in accordance with the valve embodiment shown in FIG. 1.
Figure 3:
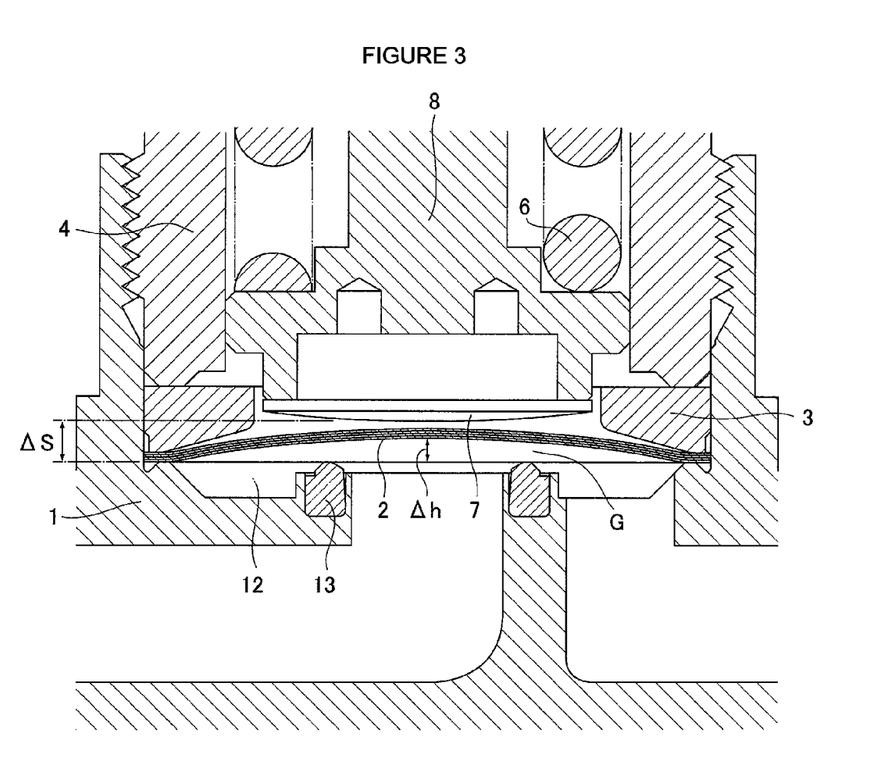
FIG. 3 is an explanatory drawing showing a deformed condition of the metal diaphragm when the valve is open with a valve stroke ΔS=1.5 mm, in accordance with the valve embodiment shown in FIG. 1.
Figure 4:
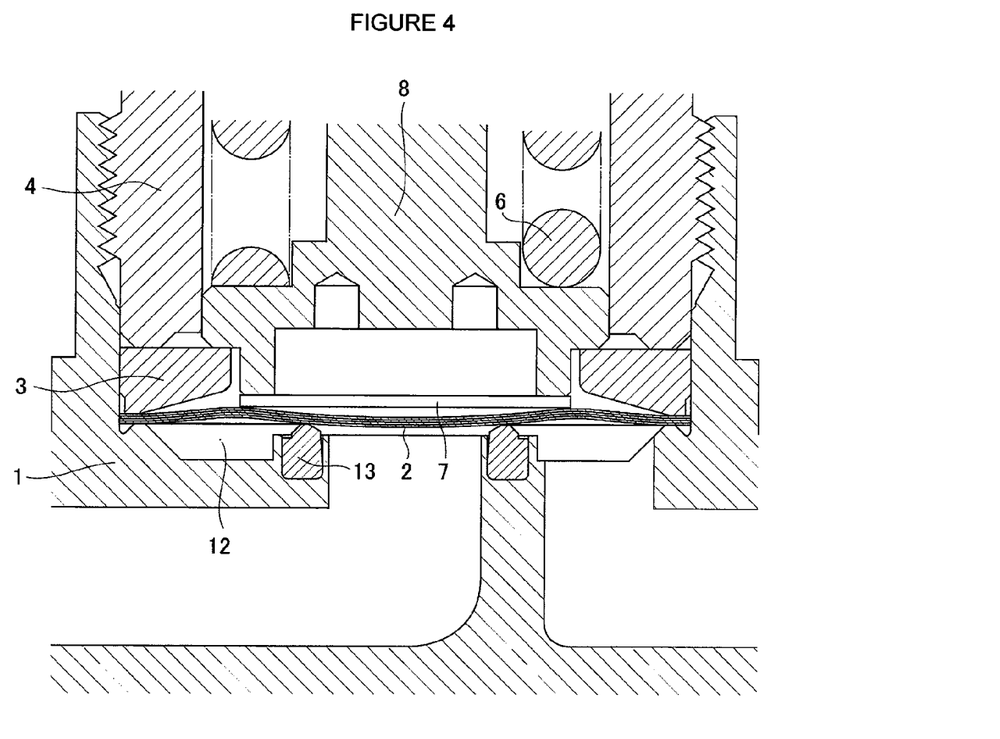
FIG. 4 is an explanatory drawing showing a deformed condition of the metal diaphragm when the valve is closed with a valve stroke ΔS=0.7 mm, in accordance with the valve embodiment shown in FIG. 1.
Figure 5:
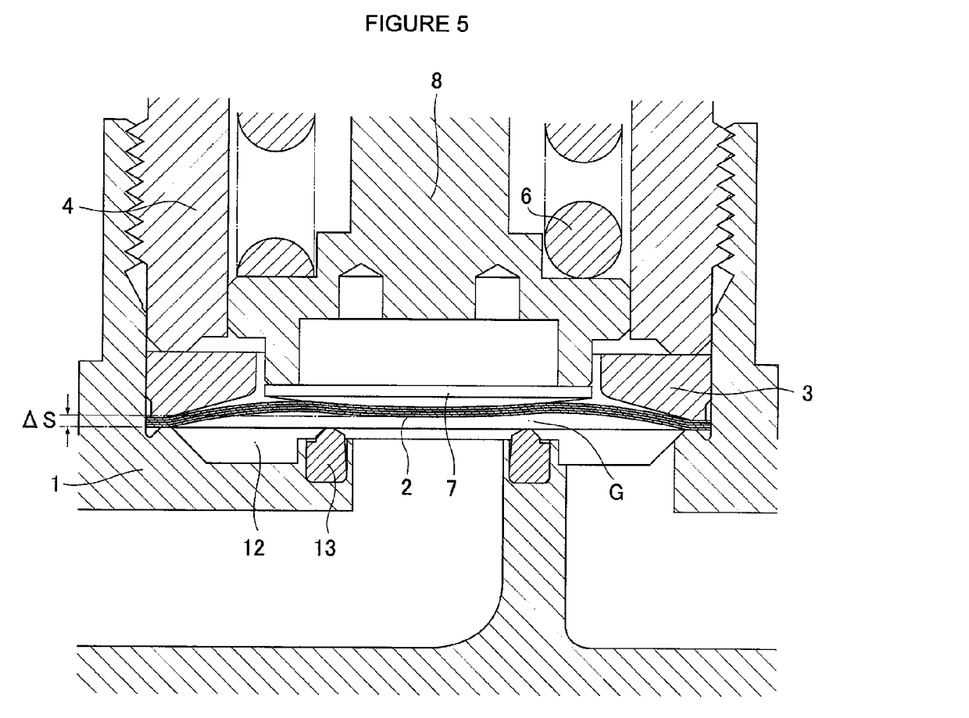
FIG. 5 is an explanatory drawing showing a deformed condition of the metal diaphragm when the valve is open with a valve stroke ΔS=0.7 mm, in accordance with the valve embodiment shown in FIG. 1.

The embodiment in accordance with the present invention is described as follows with reference to the drawings. FIG. 1 is a cross sectional schematic view of a direct touch type metal diaphragm valve (hereinafter called a "metal diaphragm valve") according to the present invention in the case wherein the metal diaphragm valve is made to be an NC (normally closed) type valve. FIG. 2 and FIG. 3 are enlarged views to show deformed forms when the metal diaphragm shown in FIG. 1 is closed and opened with a valve stroke $\Delta S=1.5$ mm. Furthermore, FIG. 4 and FIG. 5 are enlarged views showing deformed forms when the metal diaphragm shown in FIG. 1 is closed and opened with a valve stroke $\Delta S=0.7$ mm.

As shown with FIG. 1, 1 designates a body, 2 designates a metal diaphragm, 3 designates a press adaptor, 4 designates a bonnet, 5 designates a screw part, 6 designates a spring, 7 designates a diaphragm presser, 8 designates a stem, 9 designates an actuator, 10 designates a fluid inlet, 11 designates a fluid outlet, 12 designates a valve chamber, 13 designates a valve seat, 14 designates a driving shaft, 15 designates a stroke adjustment mechanism, 16 designates an electro-magnetic valve, and 17 designates a proximity sensor.

The afore-mentioned body 1 is made out of stainless steel in a near-cross shape and is provided with a concave valve chamber 12 with an open top for communication to a fluid inlet 10 and a fluid outlet 11 on both sides of the chamber, wherein the fluid inlet 10 and the fluid outlet 11 open on an upper part of the body. A synthetic resin (PFA: perfluoroalkoxyi, PA: polyimide, PI: polyimide, PCTFE: polychlorotrifluoroetylene, and the like) made valve seat 13 is fitted and fixed to the bottom face of the valve chamber 12. In accordance with the present embodiment of the invention, the valve seat 13 is fixed to a valve fitting groove by means of so-called cramp processing.

The afore-mentioned metal diaphragm 2 is installed above the valve seat 13, to maintain hermeticity of the valve chamber 12, and moves to and away from the valve seat 13 with its center part moving upward and downward. In accordance with the present embodiment, the metal diaphragm 2 is formed in a round, reverse-dish shape by bulging a center part of a thin metal plate (0.1 to 0.2 mm thick) made of special stainless steel (such trade names as Inconel, Spron), and the like, and a thin Nickel.Cobalt alloy plate (0.1 to 0.2 mm thick) upward. By laminating 3 pieces of the reverse-shaped thin special stainless steel plate and 1 piece of a Nickel.Cobalt alloy plate into intimate contact, the metal diaphragm 2 is formed in a reverse-dish shape. The metal diaphragm 2, which has a peripheral part that is placed on the extruded part of an inner peripheral face of the valve chamber 12, is thrust onto the extruded side of the body 1 through the mediation of a stainless steel made press adaptor 3 by means of the lower end of a bonnet 4 that is inserted into the valve chamber 12 and is screwed into a screw part 5 of the body 1, thus allowing the metal diaphragm 2 to be held and fixed hermetically. The Nickel.Cobalt alloy film is placed on the gas-contacting side of the metal diaphragm.

More specifically, the metal diaphragm 2 is formed to have an outer diameter of 26 mm, a curvature of the bulged part of 60 mm in the case wherein the valve is used for a valve with an inner diameter of a fluid passage of 9.52 mm$\phi$. The maximum bulge height $\Delta h$ of the afore-mentioned bulged part ($\Delta h$ in FIG. 3 described later) is 1.2 mm. As examples of a metal diaphragm 2 as implemented, there exist one metal diaphragm with an outer diameter of 20 mm and a curvature of 62.6 mm for a valve with an inner diameter of a fluid passage of 6.35 mm$\phi$, and another metal diaphragm with an outer diameter of 15 mm and a curvature of 62.6 mm for a small sized valve with an inner diameter of a fluid passage of 6.35 mm$\phi$, and the like.

The afore-mentioned bonnet 4 is formed in a cylindrical shape and is inserted into the valve chamber 12 of the body 1, and is fixed to the side of the body 1 by means that it is screwed into the screw part 5 provided on the inner peripheral face of the valve chamber 12.

The afore-mentioned stem 8 is inserted Into the lower end part of the bonnet 4 for free descending and ascending. A synthetic resin made diaphragm presser 7, which contacts with the upper face of the center part of a metal diaphragm 2, is provided on the lower end face of the stem 8.

More specifically, stem 8 is installed in the bonnet 4 for free descending and ascending so that the polyimide made diaphragm presser 7 fixed on the lower end face contacts with the metal diaphragm 2, and is pressed down with the elastic force of spring 6 through the mediation of a diaphragm presser 7 so that the center part of the metal diaphragm 2 can rest on the valve seat 13. A driving shaft 14 for an actuator 9, which operates the stem, is fixed on the upper end part of the stem 8

There is provided a brim part 8a on the lower part of the afore-mentioned stem 8. When the valve is fully closed (or the center part of a metal diaphragm 2 rests on the valve seat 13), excessive descent of the stem 8 is controlled due to the brim part 8a, which touches the upper face of the afore-mentioned press adaptor.

The afore-mentioned stroke adjustment mechanism 15 comprises a lock nut 15a screwed to a supporting cylinder part 9a of the actuator 9 and fixed by screwing to the upper face of a bonnet 4. A screw 9b for the lock nut 15a is provided on the outer peripheral face of the supporting cylinder part 9a, and the like. The height position of the supporting cylinder part 9a screwing into the bonnet 4 can be adjusted so that the size of the valve stroke $\Delta S$ is adjusted.

The afore-mentioned electro-magnetic valve 16 is directly fixed to the upper face of the actuator 9 and controls the flow of a driving fluid (air) A supplied into the actuator 9. The reason why the actuator 9 is directly fixed to the electro-magnetic valve 16 is to raise responsivity of open/close operations of the valve by minimizing the space of the driving fluid passage as described later (shortening of open/close operation time).

The afore-mentioned proximity sensor 17, which is for detecting changes of the valve stroke $\Delta S$ and the valve stroke $\Delta S$ itself at the time when the valve is operated for opening and closing, is formed on the upper face side of the actuator 9. The afore-mentioned stroke adjustment $\Delta S$ is detected by measuring the space $\Delta G$ with a piston 9c.

Next, the operating procedure of a metal diaphragm valve, in accordance with the present invention, is explained. A valve, as shown in FIG. 1 is constituted as a so-called NC (normally closed) type, thrusts the metal diaphragm 2 downward through the mediation of stem 8 with elastic force of the spring 6 at all times, and the thin Nickel Cobalt alloy plate of the down side face (a gas contacting face) of the metal diaphragm remains rested on the valve seat 3. Thrust of the stem 8 is adjusted by the spring 6, and the descending volume of stem 8 is regulated by the press adaptor 3.

When driving air A is supplied to the actuator 9, a driving shaft 14 is raised upward by a valve stroke $\Delta S$ through mediation of the piston 9c, thus allowing the center part of the metal diaphragm 2 to be restored to the shape that is bulged upward by its elastic force so that the valve is opened. The afore-mentioned valve stroke $\Delta S$ is adjusted to a prescribed value by means of the lock nut 15a of the stroke adjustment mechanism 15. Specifically, as described later, the valve stroke $\Delta S$ is set to 0.65 to 0.8 mm (preferably 0.7 mm) in the case wherein the metal diaphragm 2 has an outer diameter of 26 mm$\phi$, a curvature of 60 mm, the maximum height of the bulged part Δh=1.2 mm, 3 pieces of 0.15 mm thick special stainless steel plate and 1 piece of 0.15 mm thick Nickel.Cobalt alloy plate (which is hereinafter called "a metal diaphragm in the implementation example 1") when the metal diaphragm is used for a valve for a diameter of 9.52 mmϕ.

Next, it is described how the valve stroke ΔS of the metal diaphragm 2, in accordance with the present invention, is decided.

Embodiment 1

Referring to FIG. 2, FIG. 2 is a partially enlarged view to show the closed state of the valve for which the metal diaphragm 2 in the afore-mentioned implementation example 1 is used. FIG. 3 is a partially enlarged view to show the open state of the valve for which the metal diaphragm 2 in the afore-mentioned implementation example 1 is used. In accordance with FIG. 2 and FIG. 3, the valve stroke ΔS is chosen to be 1.5 mm. The metal diaphragm 2 is completely restored to its original shape due to the fact that the valve stroke ΔS is larger than the maximum height Δh=1.2 mm of a bulged part of the metal diaphragm 2.

Embodiment 2

FIG. 4 and FIG. 5 are partly enlarged views to show a closed state (FIG. 4) and an open state (FIG. 5) when the valve stroke ΔS is made to be 0.7 mm in accordance with the valve shown in FIG. 1, in which the diaphragm 2 in the implementation example 1, mentioned above, is used. The metal diaphragm 2 remains slightly deformed without being restored completely back to its original state, as shown in FIG. 3, even when the valve is closed. Specifically, when the valve stroke ΔS is made to be small, deformation volume of the metal diaphragm 2 becomes small; hence, distortion stress applied to the metal diaphragm 2 becomes relatively small.

Now, when comparing a valve stroke ΔS=1.5 mm with a valve stroke ΔS=0.7 mm, much difference is seen in the shape of a metal diaphragm 2 as stated before, but it is learned that not much difference is seen in the space G between a valve seat 3 and the inner surface of a metal diaphragm 2.

Embodiment 3

Figure 6:
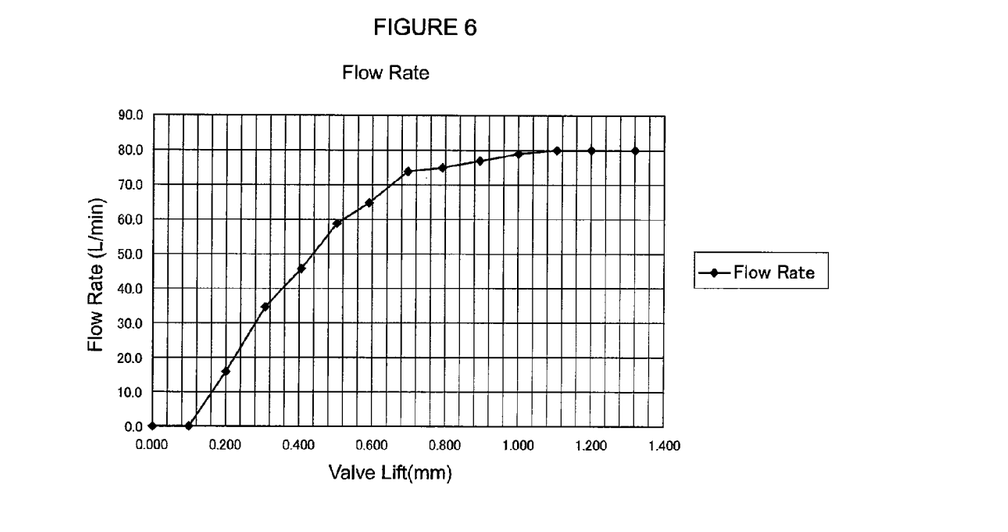
FIG. 6 is a diagram showing the relationship between the valve stroke ΔS (valve lift) and the flow rate with a valve in accordance with FIG. 1.
Figure 7:
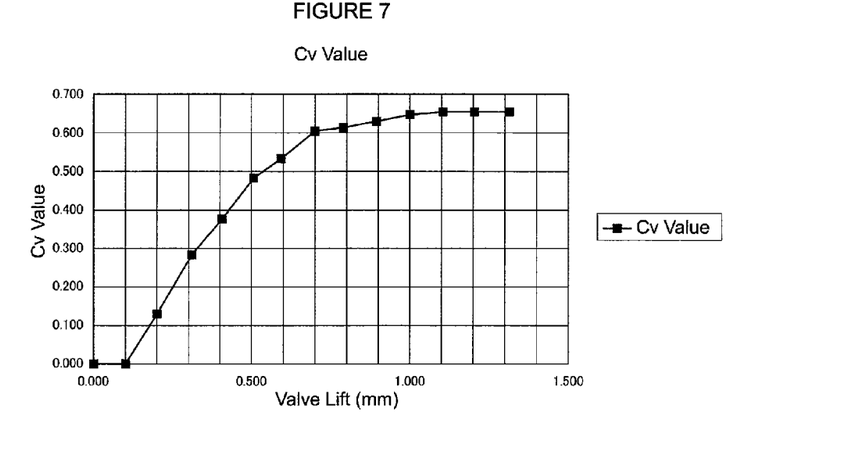
FIG. 7 is a diagram showing the relationship between the valve stroke ΔS (valve lift) and the Cv value with a valve in accordance with FIG. 1.

FIG. 6 and FIG. 7 show the results of a Cv value obtained by the afore-mentioned equation (2) after the flow rate was measured by using the afore-mentioned Cv value measurement test device, shown in FIG. 8, on the metal diaphragm shown in FIG. 1 wherein the metal diaphragm 2 in the afore-mentioned implementation example 1 is used. Table 1 is a chart to show the lift, flow rate and Cv value corresponding to this test. The test was conducted under conditions of operating air pressure of 0.55 Mpa, and the projected height of the valve seat of 0.128 mm (the height after baking at 80° C.).

TABLE 1

| Lift (mm) | Flow Rate (L/min) | Cv Value |
| --- | --- | --- |
| 0.000 | 0.0 | 0.000 |
| 0.102 | 0.4 | 0.003 |
| 0.203 | 15.9 | 0.130 |
| 0.310 | 34.8 | 0.284 |
| 0.408 | 46.0 | 0.375 |
| 0.505 | 59.0 | 0.482 |
| 0.593 | 65.0 | 0.531 |
| 0.700 | 74.0 | 0.604 |

TABLE 1-continued

| Lift (mm) | Flow Rate (L/min) | Cv Value |
| --- | --- | --- |
| 0.792 | 75.0 | 0.612 |
| 0.897 | 77.0 | 0.628 |
| 1.000 | 79.0 | 0.645 |
| 1.106 | 80.0 | 0.653 |
| 1.202 | 80.0 | 0.653 |
| 1.316 | 80.0 | 0.653 |

As apparent from FIG. 6 and FIG. 7, it is learned that a Cv value of 0.55 to 0.6 required for the valve can be achieved with a valve stroke ΔS of approximately 0.65 to 0.8. In particular, by making the valve stroke ΔS to be 0.7 mm, a Cv value of 0.6 can be achieved. It is learned that there is no need for the metal diaphragm 2 to be deformed to the maximum extent possible by making the valve stroke to be 1.3 mm (the maximum value).

Embodiment 4

Table 2 shows the results of the same test on a valve having the same diaphragm specifications as those in Table 1 for the metal diaphragm 2 in the implementation example 1, mentioned above, only except that the diameter of the pipe passage connected to the fluid inlet 10 is 6.35 mmϕ. For this test, 3 valves were manufactured for testing, No. 1 valve with the projected height of the valve seat 3 of 0.174 mm, No. 2 valve of 0.176 mm and No. 3 valve of 0.068 mm. In particular, with the No. 3 valve, the valve's open/close operations were conducted over 10000 times in advance by striking the face of a valve seat for braking in the valve and the operating air pressure was made to be 0.55 Mpa (upper limit value).

TABLE 2

| | Test Valve No. 1 | | Test valve No. 2 | | Test valve No. 3 | |
| --- | --- | --- | --- | --- | --- | --- |
| Lift (mm) | Flow rate | Cv Value | Flow rate | Cv Value | Flow rate | Cv value |
| 0.000 | 0.0 | 0.000 | 0.0 | 0.000 | 0.0 | 0.000 |
| 0.100 | 0.0 | 0.000 | 0.0 | 0.000 | 0.0 | 0.000 |
| 0.200 | 10.7 | 0.087 | 13.1 | 0.107 | 12.0 | 0.093 |
| 0.300 | 30.0 | 0.245 | 30.5 | 0.249 | 28.3 | 0.231 |
| 0.400 | 43.9 | 0.358 | 43.7 | 0.357 | 46.7 | 0.381 |
| 0.500 | 51.0 | 0.416 | 50.0 | 0.408 | 56.0 | 0.457 |
| 0.600 | 58.0 | 0.473 | 61.0 | 0 498 | 64.0 | 0.522 |
| 0.700 | 65.0 | 0.531 | 65.0 | 0.531 | 66.0 | 0.539 |
| 0.800 | 68.0 | 0.555 | 67.0 | 0.547 | 69.0 | 0.563 |
| 0.900 | 70.0 | 0.571 | 71.0 | 0.579 | 70.0 | 0.571 |
| 1.000 | 71.0 | 0.579 | 71.0 | 0.579 | 72.0 | 0.588 |
| 1.100 | 72.0 | 0.588 | 71.0 | 0 579 | 74.0 | 0.604 |
| 1.200 | 73.0 | 0.596 | 71.0 | 0.579 | 73.0 | 0 596 |
| 1.300 | 73.0 | 0.596 | 71.0 | 0.579 | 73.0 | 0.596 |

FIG. 9 graphs the result of Table 2. It is learned that, similar to the case of the metal diaphragm in the implementation example 1, a required Cv value 0.5 to 0.6 can be obtained with a value stroke ΔS of approximately 0.65~0.7.

Embodiment 5

Table 3 and Table 4 show changes of the Cv value due to deterioration of the shape of the valve seat over time, and the data shown here illustrate the relationship between the number of open/close operations and Cv value when the valve seat was struck by conducting open/closed operations of the valve at high temperature of 200° C. in advance. Table 3 shows the measurement result when the measurement of Cv value was conducted at high temperatures of 200° C., and Table 4 shows the measurement result when the measurement of Cv value was conducted at normal temperatures.

TABLE 3

| No. of Open/Close Operations (times) | No. 1 | No 2 | No. 3 |
|---|---|---|---|
| 0 | 0.304 | 0.326 | 0.316 |
| 1000 | 0.502 | 0.489 | 0.476 |
| 3000 | 0.520 | 0.507 | 0.491 |
| 5000 | 0.519 | 0.512 | 0.506 |
| 10000 | 0.529 | 0.529 | 0.511 |
| 20000 | 0.529 (74% UP) | 0.529 (62.2% UP) | 0.512 (62% UP) |

TABLE 4

| (times) | No. 1 | No. 2 | No. 3 |
|---|---|---|---|
| 0 | 0.498 | 0.506 | 0.498 |
| 20000 | 0.579 (16% UP) | 0.571 (12.8% UP) | 0.555 (11.4% UP) |

From the results shown in the above Table 3 and Table 4, it is apparent that changes of the shape of the valve seat 13 cease after continuous open/close operations of the valve over approximately 10000 times in advance, wherein the Cv value goes up and becomes nearly saturated.

Embodiment 6

Table 5 shows the relationship between the stroke ΔS when continuous open/close operations, using a valve for which the metal diaphragm 2 in the implementation example 1, mentioned above, is used, and the number of open/close operations until the time when a metal diaphragm is ruptured (the endurable number of open/close operations), where velocity of open/close operations of a valve is 3 times per second to 4 times per second.

TABLE 5

| Stroke ΔS mm | Number of endurable open/close operations |
|---|---|
| 1.2 mm or more | Approx. 1.5 million times |
| 1 mm | Approx. 2.5 million times |
| 0.7 mm | Approx. 50 million times |

As apparent from the above Table 5, with a direct touch type metal diaphragm valve for which a metal diaphragm having the maximum bulge height Δh of approximately 1.2 mm and the external diameter of 20 to 26 mmϕ is used, it is learned that the required Cv value is maintained, and at the same time the number of endurable open/close operations can be tremendously increased by means that the valve stroke ΔS is made to be the value of 55 to 70% of the maximum bulge height Δh.

FEASIBILITY OF INDUSTRIAL USE

The present invention can be applied not only to semiconductor manufacturing facilities but also to chemical goods and pharmaceutical industries as well as foods processing industry, and the like.

What is claimed is:
1. A direct touch type metal diaphragm valve comprising:
   (a) a body equipped with a valve seat on a bottom face of a concave valve chamber, wherein the valve chamber communicates with a fluid inlet and a fluid outlet;
   (b) a metal diaphragm disposed above the valve seat, wherein to hold hermeticity of the valve chamber, the metal diaphragm moves upward and downward so as to directly contact the valve seat by a center part of the metal diaphragm;
   (c) a stem disposed above the metal diaphragm so as to descend and ascend, wherein the stem allows the center part of the metal diaphragm to descend;
   (d) an actuator connected to the stem so as to allow the stem to descend or ascend; and
   (e) a press adaptor disposed above an outer peripheral part of the metal diaphragm so as to hold the metal diaphragm hermetically between the press adaptor and the bottom face of a valve chamber and to control descent of the stem at a time when the valve is fully closed, wherein the metal diaphragm includes a laminated body comprising
       i. a plurality of thin stainless steel plates; and
       ii. a thin Nickel.Cobalt alloy plate, wherein the laminated body is formed in the shape of a round, reverse-dish with a center part bulged upward, wherein movement of the metal diaphragm is regulated so that a maximum valve stroke ΔS of the valve is 55% to 70% of a distance of a maximum bulge height Δh of the metal diaphragm.

2. A direct touch type metal diaphragm valve as claimed in claim 1, wherein a Cv value of the valve at the time of the maximum valve stroke ΔS is made to be 0.55 to 0.8.

3. A direct touch type metal diaphragm valve as claimed in claim 1, wherein the metal diaphragm has a bulge curvature that is 65 to 66 mm with an outer diameter of 15 mmϕ, or a bulge curvature that is 62 to 63 mm with an outer diameter of 18 to 20 mmϕ, or a bulge curvature that is 59 to 61 mm with an outer diameter of 24 to 26 mmϕ.

4. A direct touch type metal diaphragm valve as claimed in claim 1, wherein the metal diaphragm is a round laminated body comprising three pieces of thin stainless steel plate and one piece of thin Nickel.Cobalt alloy plate, and an outer diameter of the round laminated body is 24 to 26 mmϕ, the maximum bulge height Δh is 1.2 mm to 1.3 mm, and the maximum valve stroke ΔS is 0.65 mm to 0.8 mm.

5. A direct touch type metal diaphragm valve as claimed in claim 1, wherein the valve seat is made with PFA, the stem is provided with a valve stroke adjustment mechanism so that the valve stroke ΔS is adjusted and fixed to a prescribed set value by using the valve stroke adjustment mechanism, wherein the valve stroke ΔS is adjusted and fixed to the prescribed set value after continuous open/close operations of the valve have been performed over 3000 to 10000 times.

6. A direct touch type metal diaphragm valve as claimed in claim 2, wherein the metal diaphragm has a bulge curvature that is 65 to 66 mm with an outer diameter of 15 mmϕ, or a bulge curvature that is 62 to 63 mm with an outer diameter of 18 to 20 mmϕ, or a bulge curvature that is 59 to 61 mm with an outer diameter of 24 to 26 mmϕ.

7. A direct touch type metal diaphragm valve as claimed in claim 2, wherein the valve seat is made with PFA, the stem is provided with a valve stroke adjustment mechanism so that the valve stroke ΔS is adjusted and fixed to a prescribed set value by using the valve stroke adjustment mechanism, wherein the valve stroke ΔS is adjusted and fixed to the prescribed set value after continuous open/close operations of the valve have been performed over 3000 to 10000 times.

8. A direct touch type metal diaphragm valve as claimed in claim 3, wherein the valve seat is made with PFA, the stem is provided with a valve stroke adjustment mechanism so that the valve stroke ΔS is adjusted and fixed to a prescribed set value by using the valve stroke adjustment mechanism, wherein the valve stroke ΔS is adjusted and fixed to the prescribed set value after continuous open/close operations of the valve have been performed over 3000 to 10000 times.

9. A direct touch type metal diaphragm valve as claimed in claim 4, wherein the valve seat is made with PFA, the stem is provided with a valve stroke adjustment mechanism so that the valve stroke ΔS is adjusted and fixed to a prescribed set value by using the valve stroke adjustment mechanism, wherein the valve stroke ΔS is adjusted and fixed to the prescribed set value after continuous open/close operations of the valve have been performed over 3000 to 10000 times.

* * * * *